A. CLUNAN.
Belt-Fasteners.
No. 221,524. Patented Nov. 11, 1879.
Fig: 1.
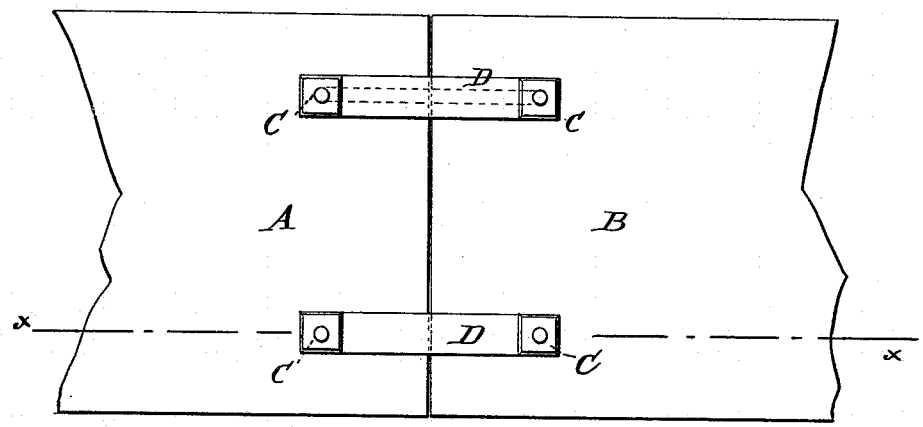
Fig: 2.
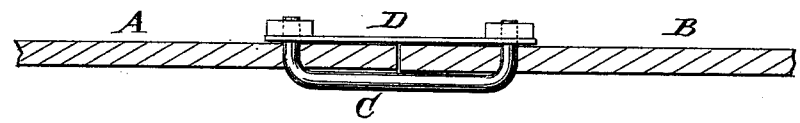
WITNESSES:
Chas. Nich.
C. Sedgwick
INVENTOR:
A. Clunan
BY Munn & Co
ATTORNEYS.

UNITED STATES PATENT OFFICE.

ALBERT CLUNAN, OF BROOKLYN, NEW YORK.

IMPROVEMENT IN BELT-FASTENERS.

Specification forming part of Letters Patent No. 221,524, dated November 11, 1879; application filed March 31, 1879.

*To all whom it may concern:*

Be it known that I, ALBERT CLUNAN, of Brooklyn, in the county of Kings and State of New York, have invented a new and Improved Belt-Coupling, of which the following is a specification.

Figure 1 is a plan view of a part of a belt to which my improvement has been applied. Fig. 2 is a detail sectional view of the same, taken through the line $x\ x$, Fig. 1.

Similar letters of reference indicate corresponding parts.

The object of this invention is to furnish an improved device for connecting the ends of leather, rubber, canvas, and other belt traces for harness and other bands and straps, which shall be simple in construction, convenient in use, being easily applied, and effective in operation, holding the ends of the belt securely, and offering no obstruction to it in passing around pulleys.

The invention consists in combining a plate with a bar bent, threaded, and provided with an end nut, as hereinafter described.

A B represent the adjacent ends of a belt or other strap to be connected. C is a bar or rod of any desired shape, the ends of which are bent upward at right angles, so as to pass through holes in the ends A B of the belt or strap. D is a bar having holes formed through its ends to receive the ends of the bar C, where it is secured in place by nuts screwed upon the ends of the bar C, or by riveting the said ends down upon the bar D. With this construction the ends A B of the belt will be firmly and securely held, and the coupling can pass around pulleys without obstructing the movement of the belt.

I am aware that a staple with spring ends that catch in a plate on the opposite side of the belt is not new; but

What I claim is—

In a belt-coupling, the combination, with a plate, D, of a bar, C, bent, threaded, and provided with a nut at each end, as shown and described.

ALBERT CLUNAN.

Witnesses:
JAMES T. GRAHAM,
C. SEDGWICK.